United States Patent
Shani et al.

(10) Patent No.: US 6,819,495 B2
(45) Date of Patent: Nov. 16, 2004

(54) AUXILIARY OPTICAL UNIT ATTACHABLE TO OPTICAL DEVICES, PARTICULARLY TELESCOPIC GUN SIGHTS

(75) Inventors: Tomer Shani, Rishon Le-Zion (IL); Isaac Malka, Rehovot (IL)

(73) Assignee: International Technologies (Lasers) Ltd., Rishon LeZion (IL)

( * ) Notice: Subject to any disclaimer, the term of this patent is extended or adjusted under 35 U.S.C. 154(b) by 0 days.

(21) Appl. No.: 10/461,689

(22) Filed: Jun. 16, 2003

(65) Prior Publication Data

US 2004/0057121 A1 Mar. 25, 2004

Related U.S. Application Data

(60) Provisional application No. 60/388,754, filed on Jun. 17, 2002.

(51) Int. Cl.[7] .................. G02B 27/14; G02B 23/08; G02B 15/02; F41G 1/00; G01C 3/08
(52) U.S. Cl. .................. 359/630; 359/629; 359/406; 359/672; 89/41.17; 356/5.01
(58) Field of Search ................. 359/399–406, 359/618, 629, 630, 466, 477, 462, 634, 638, 640, 672–675; 356/4.01–5.15, 3; 342/54; 89/41.17

(56) References Cited

U.S. PATENT DOCUMENTS

| | | | |
|---|---|---|---|
| 3,407,302 A | 10/1968 | Bouwers | |
| 3,464,770 A | 9/1969 | Schmidt | |
| 3,509,344 A | 4/1970 | Bouwers | |
| 3,529,882 A | 9/1970 | Schmidt | |
| 3,549,231 A | 12/1970 | Scidmore et al. | |
| 3,671,127 A | 6/1972 | Odone et al. | |
| 3,712,702 A | 1/1973 | Schmidt | |
| 3,782,832 A | 1/1974 | Haeskaylo | |
| 3,944,324 A | 3/1976 | Tajima et al. | |
| 3,974,585 A | 8/1976 | Dunham | |
| 4,015,895 A | * 4/1977 | Hirose | 359/673 |
| 4,136,956 A | 1/1979 | Eichweber | |
| 4,165,936 A | 8/1979 | Eisenring et al. | |
| 4,182,563 A | 1/1980 | Biber et al. | |
| 4,266,873 A | 5/1981 | Hacskaylo et al. | |
| 4,404,890 A | 9/1983 | McAlpine | |
| 4,504,143 A | 3/1985 | Heinze et al. | |
| 4,582,400 A | 4/1986 | Lough | |

(List continued on next page.)

FOREIGN PATENT DOCUMENTS

GB    2 046 551    * 3/1980

*Primary Examiner*—Georgia Epps
*Assistant Examiner*—Jack Dinh
(74) *Attorney, Agent, or Firm*—G. E. Ehrlich (1995) Ltd

(57) ABSTRACT

An auxiliary optical unit attachable to an optical device for optional use therewith, includes: (a) an afocal teleconverter lens system having a predetermined magnification; (b) a laser range finder system for measuring and displaying the range to viewed object; and (c) a beam splitter located within the auxiliary optical unit such that when the auxiliary optical unit is attached to the optical device, both the displayed range and the object are concurrently viewable by the optical device. In the described preferred embodiment, the optical device is a telescopic gun sight to which the auxiliary optical unit is quickly attachable, to provide range display and increased magnification whenever desired.

19 Claims, 4 Drawing Sheets

U.S. PATENT DOCUMENTS

| | | |
|---|---|---|
| 4,611,911 A | 9/1986 | Kadomatsu |
| 4,658,139 A | 4/1987 | Brennan et al. |
| 4,690,550 A | 9/1987 | Kuehne |
| 4,695,161 A | 9/1987 | Reed |
| 4,764,011 A | 8/1988 | Goldstein |
| 4,822,994 A | 4/1989 | Johnson et al. |
| 4,961,278 A | 10/1990 | Johnson et al. |
| 5,084,780 A | 1/1992 | Phillips |
| 5,140,151 A | 8/1992 | Weiner et al. |
| 5,164,733 A * | 11/1992 | Nettleton et al. ............. 342/54 |
| 5,272,514 A | 12/1993 | Dor |
| 5,282,082 A | 1/1994 | Espie et al. |
| 5,329,347 A | 7/1994 | Wallace et al. |
| 5,374,986 A | 12/1994 | Solinsky |
| 5,491,546 A | 2/1996 | Wascher et al. |
| 5,517,297 A | 5/1996 | Stenton |
| 5,528,418 A | 6/1996 | Bowman, Jr. |
| 5,669,174 A | 9/1997 | Teetzel |
| 5,686,690 A | 11/1997 | Lougheed et al. |
| 5,686,889 A | 11/1997 | Hillis |
| 5,699,280 A | 12/1997 | Oda et al. |
| 5,793,528 A | 8/1998 | Wallace et al. |
| 5,824,942 A * | 10/1998 | Mladjan et al. ............ 89/41.17 |
| 5,867,915 A | 2/1999 | McMillan |
| 5,880,878 A | 3/1999 | Shin |
| 5,892,617 A | 4/1999 | Wallace |
| 5,902,996 A | 5/1999 | Sauter |
| 5,946,132 A | 8/1999 | Phillips |
| 5,973,315 A | 10/1999 | Saldana et al. |
| 6,094,304 A | 7/2000 | Wallace et al. |
| 6,141,091 A | 10/2000 | Ball |
| 6,204,961 B1 | 3/2001 | Anderson et al. |
| 6,208,461 B1 | 3/2001 | Gaber |
| 6,247,259 B1 | 6/2001 | Tsadka et al. |

* cited by examiner

AUXILIARY OPTICAL UNIT ATTACHABLE TO OPTICAL DEVICES, PARTICULARLY TELESCOPIC GUN SIGHTS

This application claims benefit of 60/388,754 filed on Jun. 17, 2002.

FIELD AND BACKGROUND OF THE INVENTION

The present invention relates to an auxiliary optical unit attachable to an optical device for optional use with such device. The invention is particularly useful when embodied as an add-on device to a telescopic gun sight, such as a night vision or day vision gun sight, and is therefore described below with respect to such application.

Rifles and similar guns are frequently aimed at long distances by using a telescopic gun sight. Such sights include horizontal and vertical cross-hairs or reticles to facilitate aiming the rifle towards the target. The rifle angle above horizontal must be increased according to the distance to the target to compensate for the vertical drop by the projectile during its flight from the rifle to the target. Therefore, gun sights frequently include a range finder, such as a laser range finder, for measuring and displaying the range to the object.

Telescopic gun sights are usually designed to produce a predetermined magnification of the sighted target. If the telescopic gun sight is also to be used at night, it would also include a light-intensifier tube to enable night vision.

It will be appreciated that incorporating a range finder in the telescopic sight increases its size and weight. It will also be appreciated that increasing the magnification of the sight decreases its field of view. Both of the above can significantly affect the efficient use of telescopic gun sights, as well as of other optical devices such as cameras, microscopes, etc.

OBJECT AND BRIEF SUMMARY OF THE INVENTION

An object of the present invention is to provide an optical system particularly, but not exclusively, useful with respect to telescopic gun sights for avoiding one or both of the above drawbacks.

According to a broad aspect of the present invention, there is provided an auxiliary optical unit attachable to an optical device for optional use therewith, the auxiliary optical unit comprising: (a) an afocal teleconverter lens system having a predetermined magnification; (b) a laser range finder system for measuring and displaying the range to viewed object; and (c) a beam splitter located within the auxiliary optical unit such that when the auxiliary optical unit is attached to the optical device, both the displayed range and the object are concurrently viewable by the optical device.

Afocal teleconverter lens systems are commonly used in photography. A teleconverter is an auxiliary lens fitted between an interchangeable lens of the cameras and the camera body or a telescope objective lens in order to change the focal length of the interchangeable lens. The interchangeable lens is known in this case as the main lens. When a teleconverter is used, the F number is increased by the same proportion as the amount the teleconverter multiplies the focal length. For example, if the focal length is doubled, the aperture is smaller by two stops; if the focal length is multiplied by 1.4, the aperture is smaller by one stop. Such a system provides a virtual image of parallel light rays which can be photographed afocally with a digital camera. Most of the lower power (~3×) commercial teleconverters are actually small Galilean telescopes consisting of a positive achromat lens and a concave rear lens.

As will be described more particularly below, such an auxiliary optical unit may be embodied in a relatively small, lightweight, compact unit quickly attachable and detachable to the optical device. For example, where the optical device is a telescopic gun sight, the gun sight may be used alone for relatively short ranges and with relatively low magnification, thereby providing a relatively wide field-of-view, as well as a compact and light-weight telescopic sight. However, when the telescopic sight is to be used at relatively larger ranges, of which the user should be informed to properly aim the rifle, or when larger magnification is desired, the auxiliary optical unit may be quickly attached to the telescopic gun sight to provide a measurement and display of the range, as well as a magnification, of the target imaged by the gun sight. When the auxiliary optical unit is no longer needed, it may be quickly detached to enable the telescopic gun sight again to be used without the drawbacks of increased size and weight and decreased field of view.

According to further features in the preferred embodiments of the invention described below, the afocal teleconverter lens system includes: a teleconverter front lens oriented to view a desired object, and a teleconverter rear lens oriented to be in alignment with the optical axis of the optical device when attached thereto; the beam splitter is located between the teleconverter front lens and the teleconverter rear lens.

According to still further features in the described preferred embodiments, the laser range finder system includes: (i) a laser transmitter for generating and transmitting a laser beam; (ii) a laser beam transmitter lens; (iii) a laser receiver for receiving the laser beam and for measuring the range; and (iv) a display module for displaying the measured range.

Two embodiments of the invention are described below for purposes of example. In one described preferred embodiment, the auxiliary optical unit includes a laser beam receiver lens for receiving the laser beam after reflection from the object. In a second described preferred embodiment, the laser beam is received via the teleconverter front lens and is reflected by the beam splitter towards the laser receiver module.

As indicated above, while the invention is particularly useful with telescopic gun sights, it may also be used with other optical devices, such as cameras, microscopes, monoculars, binoculars, etc.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

The Embodiments of FIGS. 1–5

Figure 1:
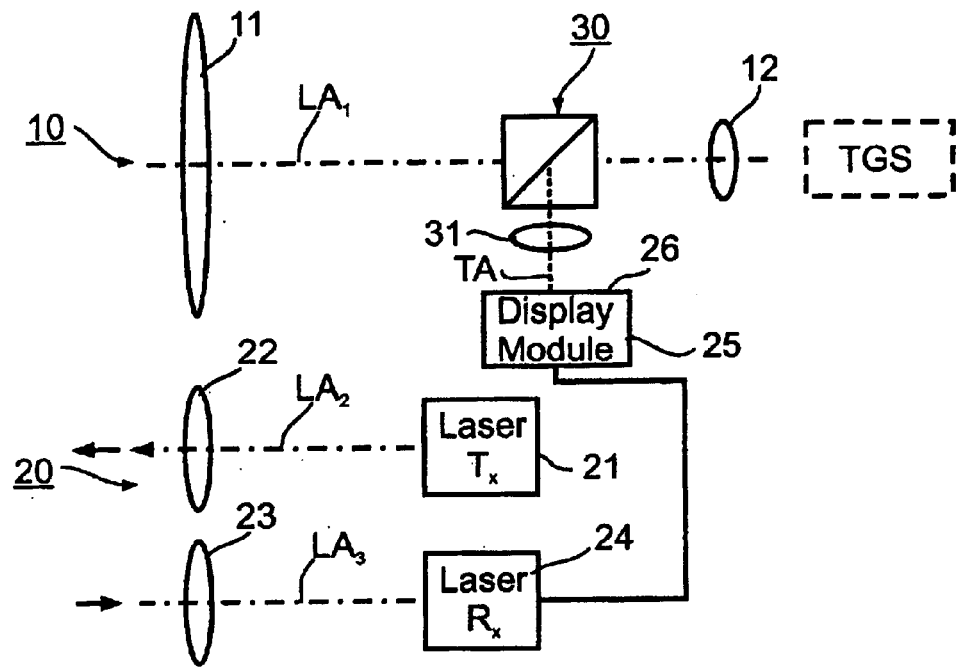
FIG. 1 is an optical diagram schematically illustrating the main optical elements of one form of auxiliary optical unit constructed in accordance with the present invention for optional use with an optical device, such as a telescopic gun sight.
Figure 2:
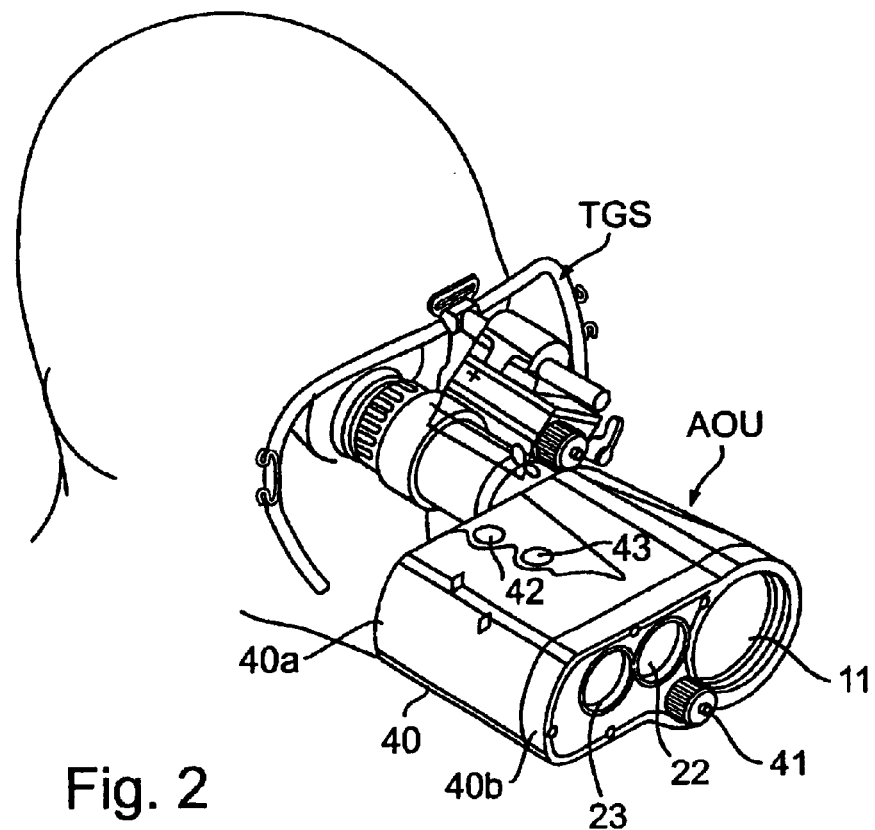
FIG. 2 is a pictorial illustration showing the use of the auxiliary optical unit constructed according to FIG. 1 attached to a telescopic gun sight.

With reference first to FIG. 1, there is schematically illustrated one form of auxiliary optical unit constructed in accordance with the present invention for attachment to an optical device, particularly a telescopic gun sight TGS as illustrated in FIG. 2, for optional use with the optical device.

The auxiliary optical unit illustrated in FIG. 1 includes (a) an afocal teleconverter lens system, generally designated 10, having a predetermined magnification; (b) a laser range finder system, generally designated 20, for measuring the range to a viewed object, such as a target to be sighted; and (e) a beam splitter, generally designated 30, located within the afocal teleconverter lens system 20 such that, when the auxiliary optical unit of FIG. 1 is attached to the optical device (e.g., a telescopic gun sight TGS), both the displayed range and the object (target) are concurrently viewable through the telescopic gun sight.

The afocal teleconverter lens system 10 includes a teleconverter front lens 11 oriented to view the desired object, and a teleconverter rear lens 12 oriented to be in aligment with the optical axis of the telescopic gun sight TGS when the auxiliary optical unit is attached to it. As shown in FIG. 1, the teleconverter front and rear lenses 111 and 12, respectively, and the beam splitter 30, are axially aligned with each other along a first longitudinal axis $LA_1$.

As further shown in FIG. 1, the laser range finder system 20 for measuring the range to the viewed object includes: a laser transmitter module 21 for generating a laser beam to be transmitted; a laser beam transmitter lens 22 for transmitting the laser beam; a laser beam receiver lens 23 for receiving the laser beam after reflection from the object; and a laser beam receiver module 24 for processing the received laser beam and utilizing the transit time of the laser beam to produce a measurement of the range. The laser range finder system 20 further includes a display module 25 producing a display (e.g., a four-digit display) of the measured range, which is displayed in the display plane shown at 26 in FIG. 1. Also displayed is the reticle, i.e., horizontal and vertical cross-hairs or aiming point.

In the optical diagram illustrated in FIG. 1, laser transmitter module 21 and laser beam transmitter lens 22 are optically aligned along a second longitudinal axis $LA_2$ parallel to, and laterally of, longitudinal axis $LA_1$. Laser beam receiver lens 23 and laser receiver module 24 are also optically aligned with each other along a third longitudinal axis $LA_3$ parallel to, and laterally of, longitudinal axis $LA_2$.

As further shown in FIG. 1, beam splitter 30 is located between the teleconverter front lens 11 and the teleconverter rear lens 12, such that longitudinal axis $LA_1$ of the two teleconverter lenses is coaxial with one orthogonal axis (the horizontal axis) of the beam splitter.

As further shown in FIG. 1, the display plane 26, in which the measured range is displayed, is optically aligned with beam splitter 30 along a transverse axis TA, perpendicular to longitudinal axis $LA_1$, so as to be coaxial with the other orthogonal axis (the vertical axis) of the beam splitter.

It will thus be seen that when the auxiliary optical unit illustrated in FIG. 1 is attached to an optical device, such as a telescopic gun sight TGS as shown in broken lines in FIG. 1, the optical axis of the optical device is coaxial with longitudinal axis $LA_1$, and that the measured range and reticle displayed at 26, and the object as viewed via teleconverter lenses 11 and 12, will be concurrently viewable through the optical device.

The auxiliary optical unit illustrated in FIG. 1 includes a quickly attachable and detachable connection for attaching it to the optical device (e.g., the telescopic gun sight TGS) such that the sight may normally be used alone (i.e., without the auxiliary optical unit), and also with the auxiliary optical unit when longer ranges are involved. Thus, in normal use when short ranges are involved, the sight, without the auxiliary optical unit attached, is relatively light and compact and therefore more conveniently useable; but when large ranges are involved, the auxiliary optical unit may be quickly attached to provide a measurement and display of range, as well as an increased magnification, both highly desirable under such conditions.

FIG. 2 pictorially illustrates an auxiliary optical unit, therein generally designated AOU, constructed as described above and attached to a conventional telescopic gun sight TGS, to provide the above advantages. FIGS. 3-5b more particularly illustrate the construction of the auxiliary optical unit AOU of FIG. 2. To facilitate understanding, those optical elements within the auxiliary optical unit AOU which correspond to the optical diagram of FIG. 1 are identified by the same reference numerals used in the optical diagram of FIG. 1.

As shown in FIG. 2, the auxiliary optical unit AOU includes a housing 40 for holding the various optical elements of the auxiliary optical unit. Housing 40 is quickly attachable and detachable at its rear end 40a to the telescopic gun sight TGS, such that its front end 40b extends forwardly of the telescopic gun sight. As further shown in FIG. 2, the front end 40b of housing 40 includes the teleconverter front lens 11, the laser beam transmitter lens 22, and the laser beam receiver lens 23. Further seen in FIG. 2 is a removable cap 41 for permitting insertion or removal of a battery used as the power supply for the laser range finder system housed within the auxiliary optical unit AOU.

FIG. 2 further illustrates two manual knobs 42, 43, projecting from the upper wall of housing 40. Knob 42 serves as a manual control member for manually turning "on" or "off" the measured range display (25, 26 in FIG. 1) should that be desired; and knob 43 serves as a manual control member for manually increasing or decreasing the brightness of the measured range display.

Figure 3:
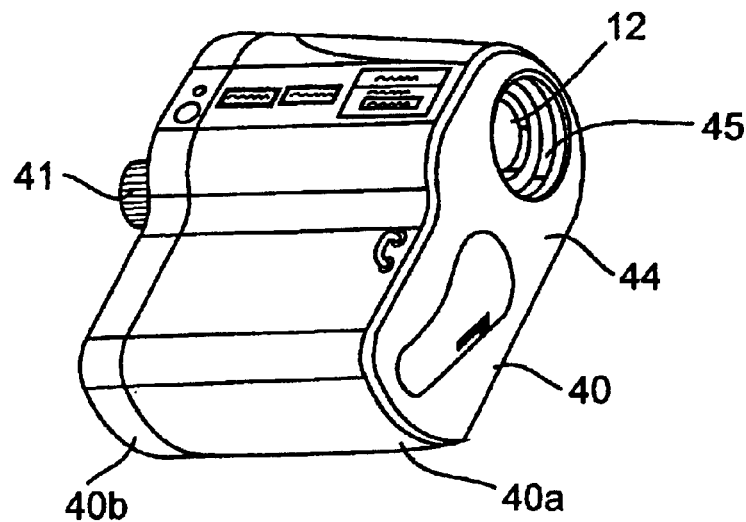
FIG. 3 is a three-dimensional view illustrating the auxiliary optical unit of FIG. 2.

FIG. 3 is a three-dimensional view more particularly illustrating the rear end 40a of the auxiliary optical unit AOU. As shown in FIG. 3, the end wall 44 at end 40a of the housing is formed with a socket 45 in alignment with the teleconverter rear lens 12. Socket 45 is adapted to receive a pin (not shown) carried by the respective wall of the telescopic gun sight TGS to enable the auxiliary optical unit AOU to be quickly attached to, and detached from, the telescopic gun sight with a snap-fit.

Figure 5:
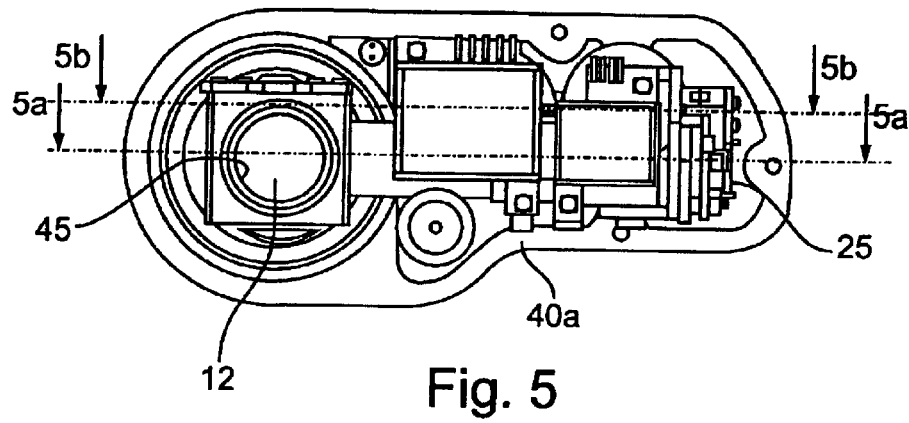
FIG. 5 is a front end view of the auxiliary optical unit of FIG. 4.
Figures 5A, 5B:
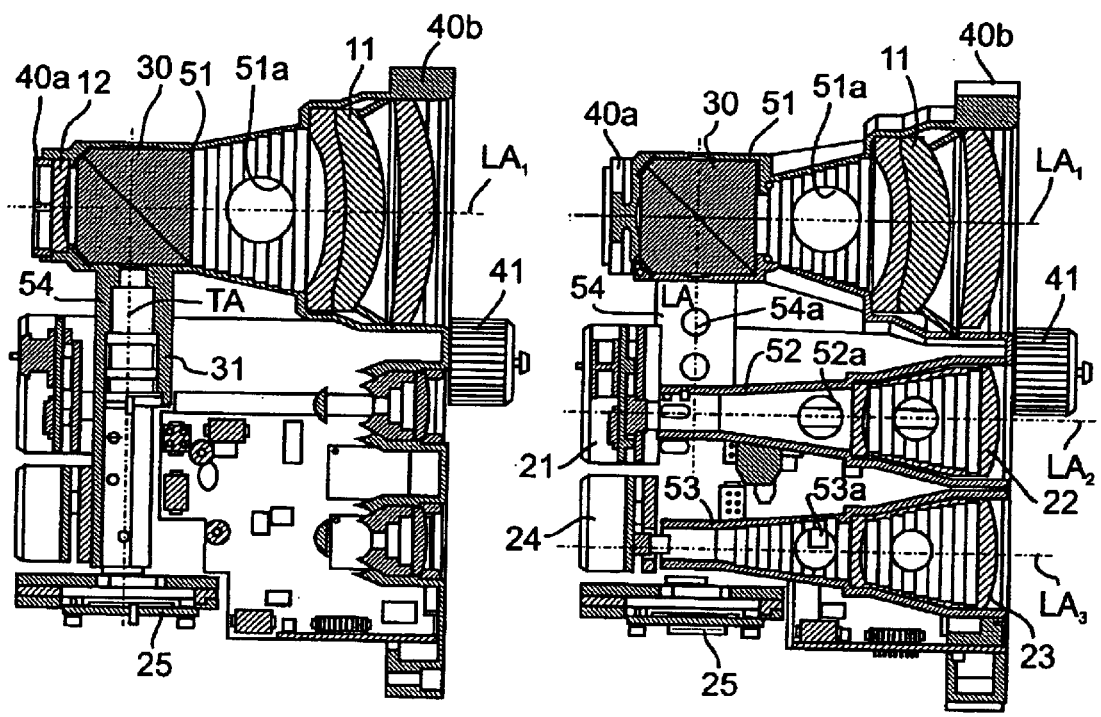
FIGS. 5a and 5b are sectional views along section lines 5a—5a and 5b—5b, respectively, of FIG. 5.

The internal structure of the auxiliary optical unit AOU, particularly the various optical elements aligned with the three longitudinal axes $LA_1$, $LA_2$, $LA_3$ and the transverse axis TA illustrated in the optical diagram of FIG. 1, are best seen in the sectional views of FIGS. 5a and 5b. Housing 40 is provided with three longitudinally-extending optical channels 51, 52, 53, for the elements of the three longitudinally axes $LA_1$, $LA_2$, $LA_3$, respectively, and with a transversely-extending channel 54 for the elements of the transverse axis TA.

Thus, FIG. 5a (a sectional view along line 5a—5a of FIG. 5), clearly illustrates the teleconverter front lens 11, the teleconverter rear lens 12, and the beam splitter 30 inbetween, aligned along longitudinal axis $LA_1$ of optical channel 51, which is the axis with which the telescopic gun sight TGS is also aligned. FIG. 5b (a sectional view along line 5b—5b of FIG. 5) clearly illustrates the laser transmitter module 21 of the range finder system 20, and the laser beam transmitter lens 22, aligned along longitudinal axis $LA_2$ of optical channel 52. FIG. 5b also illustrates the laser beam receiver lens 23 and the laser receiver module 24 aligned along longitudinal axis $LA_3$ of optical channel 53. FIG. 5a best illustrates the four-digit display 25 displaying the measured range, together with the reticle. The relay lens 31 located to project the displayed range and reticle towards one side of the beam splitter 30, is enclosed within optical channel 54 along transverse axis TA.

All the foregoing optical elements may be of known construction. Therefore, they are not described herein in detail. These optical elements are incorporated in their respective optical channels 51–54, respectively, to form a compact, lightweight, auxiliary optical unit which may be conveniently carried and held in the palm or pocket of the user for quick attachment to the normal telescopic gun sight when required, and for quick detachment therefrom when no longer required. For weight-decreasing purposes, the optical channels 51–54 may be formed with openings, e.g., as shown at 51a–54a, respectively in FIG. 5b.

Figure 4:
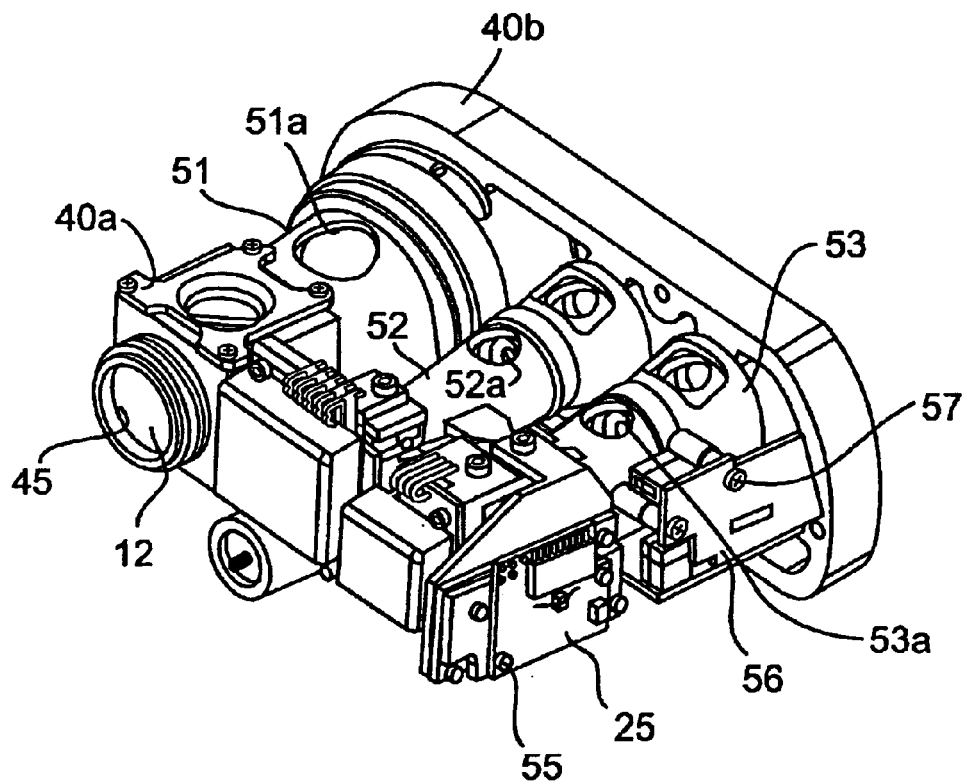
FIG. 4 is a three-dimensional view illustrating the auxiliary optical unit of FIG. 3 with a part of the outer casing removed to better show internal structure.

As shown in FIG. 4, the display module 25 is secured to one side of housing 40 adjacent its rear end 40a by a plurality of fasteners 55. The auxiliary optical unit also includes a control board 56 secured to the same side of the housing, adjacent its front end 40b, by a plurality of fasteners 57.

The manner of using the illustrated auxiliary optical unit AOU will be apparent from the above description. Thus, in the normal use of the telescopic gun sight TGS, the auxiliary optical unit AOU would be detached from it and held in a pocket or in a hand of the user. However, whenever the user wishes to use the telescopic gun sight for longer ranges, and/or for higher magnification, the auxiliary optical unit AOU would be attached to the telescopic gun sight, as shown in FIG. 2, by press-snapping the socket 44 (FIG. 3) of the auxiliary optical unit into a complementary pin (not shown) projecting from the front end of the telescopic gun sight. When the auxiliary optical unit is so attached to the telescopic gun sight, the user views the object (target) with increased magnification (e.g., 3×) via longitudinal axis $LA_1$ through the beam splitter 30 of the auxiliary optical unit, and also views, via the transverse axis TA of the beam splitter, the range measured and displayed by the display module 25 of the auxiliary optical unit. For returning to normal use of the telescopic gun sight TGS, the auxiliary optical unit AOU may be detached by a simple pull-out force applied to the auxiliary optical unit.

Such an arrangement thus provides the user with the advantages of compact construction and lightweight for normal use of the telescopic gun sight TGS, and the advantages of higher magnification and range display whenever desired, by merely attaching the auxiliary optical unit AOU to the front end of the telescopic gun sight TGS, as shown in FIG. 2.

Figure 6:
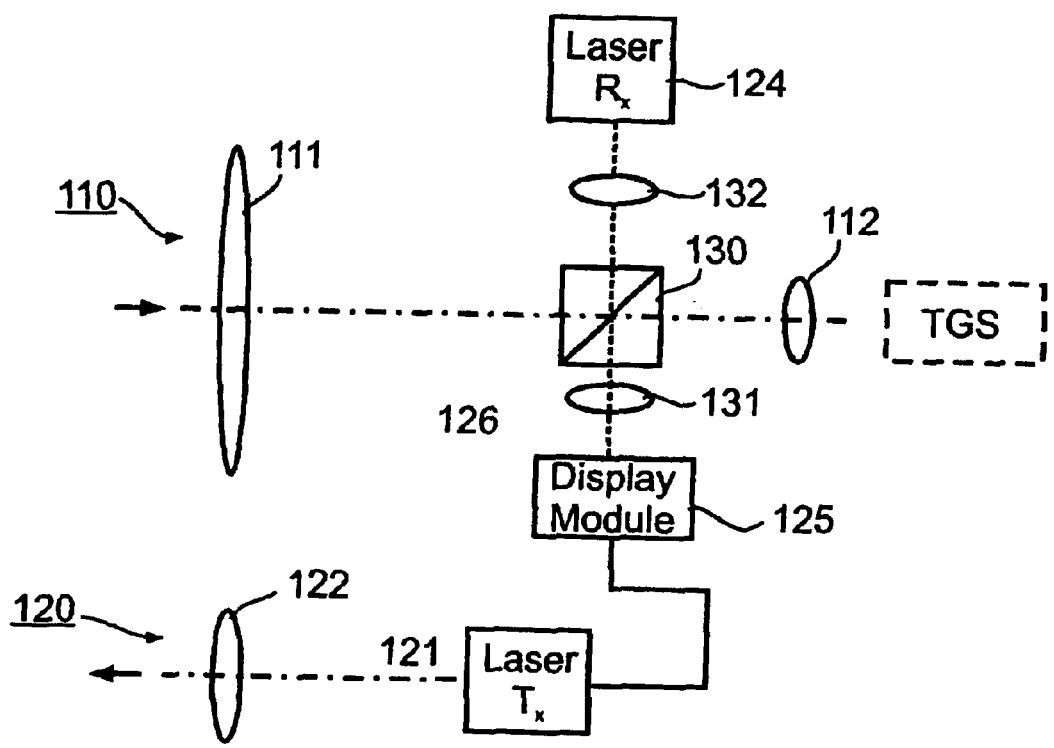
FIG. 6 is an optical diagram schematically illustrating the main optical elements of another auxiliary optical unit constructed in accordance with the present invention.

The Embodiment of FIG. 6

FIG. 6 schematically illustrates another auxiliary optical unit constructed in accordance with the present invention including the same basic elements as the auxiliary optical unit illustrated in FIG. 1 but in a slightly different optical arrangement. To facilitate understanding, the optical elements in FIG. 6 corresponding to those illustrated in FIG. 1 are identified by the same reference numerals but increased by "100".

Thus, the auxiliary optical unit illustrated in FIG. 6 also includes an afocal teleconverter lens system, generally designated 110, having a predetermined magnification; a laser range finder system, generally designated 120, for measuring and displaying the range to an object (target) to be viewed; and a beam splitter, generally designated 130, located within afocal teleconverter lens system 110 such that when the auxiliary optical unit is attached to the telescopic gun sight, as shown in FIG. 2, both the displayed range and the object, with increased magnification, are concurrently viewable via the telescopic gun sight. In this case, however, the laser beam is received via the front lens of the teleconverter system, rather than via a separate lens.

Thus, as shown in FIG. 6, the afocal teleconverter lens system 110 includes a teleconverter front lens 111 oriented to view a desired object, and a teleconverter rear lens 112 aligned with the front lens 111 along longitudinal axis $LA_1$, which axis also serves as the optical axis of the telescopic gun sight TGS when the auxiliary optical unit is attached thereto. As also shown in FIG. 6, the beam splitter 130 is located on longitudinal axis $LA_1$ between the two teleconverter lenses 111 and 112, closer to the teleconverter rear lens 112.

As further shown in FIG. 6, the laser range finder system 120 also includes a laser transmitter module 121 for generating a laser beam, and a laser beam transmitter lens 122 for transmitter the laser beam forwardly of the telescopic gun sight when the auxiliary optical unit is attached to it. As in FIG. 1, laser transmitter module 121 and laser beam transmitter lens 122 are aligned along a second longitudinal axis $LA_2$ parallel to and laterally of longitudinal axis $LA_1$.

However, in the auxiliary optical unit illustrated in FIG. 6, the laser beam is received via the teleconverter front lens 111 and is reflected by the beam splitter 130 towards the laser receiver module 124.

Thus, as shown in FIG. 6, the laser receiver sub-system includes a laser receiver module 124 located along transverse axis TA through beam splitter 130 perpendicular to longitudinal axis $LA_1$ through the beam splitter. The display plane 126 for displaying the measured range produced by the display module 125, is also located along transverse axis TA but on the opposite side of beam splitter 130. A relay lens 131 is interposed between the respective side of the beam splitter 130 and the display plane 126 along the transverse axis TA. In addition, a focussing lens 132 is located between beam splitter 130 and laser receiver module 124 to focus the received laser beam thereon.

It will thus be seen that the auxiliary optical unit illustrated in FIG. 6 operates in basically the same manner as described above with respect to FIGS. 1–5 when attached to the telescopic gun sight TGS (as illustrated in FIG. 2), to display to the viewer, along longitudinal axis $LA_1$, both the object as magnified by the auxiliary optical unit, and also the range as measured by the auxiliary optical unit. The auxiliary optical unit illustrated in FIG. 6 thus also provides the user with the same advantages as described above with respect to that of FIGS. 1–5, namely the advantage of lightweight and compactness in the normal use of the telescopic gun sight, together with the advantages of magnification and range-display whenever desired.

Other Variations and Applications of the Invention

The invention has been described above particularly with respect to a telescopic gun sight (which may be, for example, one having day vision alone, or day vision together with night vision). It will be appreciated, however, that the invention may used in other applications, e.g., with simple monoculars or binoculars, cameras, microscopes, etc. Also, although the invention has been described with respect to two embodiments, many other variations may be made, e.g., in the construction of the lenses or in the orientation of the lenses within the auxiliary optical unit.

It will therefore be appreciated that while the invention has been described with respect to two preferred embodiments, these are set forth merely for purposes of example, and that the invention may be used in many other variations and in many other applications.

What is claimed is:

1. An auxiliary optical unit attachable to an optical device for optional use therewith, said auxiliary optical unit comprising:
   (a) an afocal teleconverter lens system having a predetermined magnification;
   (b) a laser range finder system for measuring and displaying the range to a viewed object; and
   (c) a beam splitter located within said auxiliary optical unit such that when the auxiliary optical unit is attached to the optical device, both the displayed range and the object are concurrently viewable by the optical device.

2. The auxiliary optical unit according to claim 1, wherein said afocal teleconverter lens system includes a teleconverter front lens oriented to view the object, and a teleconverter rear lens oriented to be in alignment with the optical axis of said optical device when attached thereto; said beam splitter being located between said teleconverter front lens and said teleconverter rear lens.

3. The auxiliary optical unit according to claim 2, wherein said laser range finder system includes:
   (i) a laser transmitter for generating and transmitting a laser beam;
   (ii) a laser beam transmitter lens;
   (iii) a laser receiver for receiving the laser beam and for measuring said range; and
   (iv) a display module for displaying said measured range.

4. The auxiliary optical unit according to claim 3, wherein said unit further includes a relay lens located to project said displayed range towards said beam splitter.

5. The auxiliary optical unit according to claim 3, wherein said laser range finder system includes a laser beam receiver lens for receiving the laser beam after reflection from the object.

6. The auxiliary optical unit according to claim 3, wherein the laser beam is received via the front lens of the afocal teleconverter lens system.

7. The auxiliary optical unit according to claim 6, wherein the received laser beam is reflected by said beam splitter towards said laser receiver module.

8. The auxiliary optical unit according to claim 7, wherein said unit further includes a focussing lens located between said beam splitter and said laser receiver module for focussing the received laser beam thereon.

9. The auxiliary optical unit according to claim 3, wherein said afocal teleconverter lens system has a magnification of approximately "3".

10. The auxiliary optical unit according to claim 3, wherein said afocal teleconverter lens system, laser range finder system, and beam splitter, are all disposed within a common housing having a quickly-attachable/detachable connection for attaching same to said optical device.

11. The auxiliary optical unit according to claim 10, wherein said quickly-attachable/detachable connection is a pin-and-socket connection.

12. The auxiliary optical unit according to claim 10, wherein:
   said teleconverter front lens and teleconverter rear lens are located in said housing in a first optical channel having a first longitudinal axis;
   said beam splitter is located in said first optical channel between the teleconverter front lens and teleconverter rear lens and closer to the teleconverter rear lens;
   said display is located in said housing along a transverse axis perpendicular to said first longitudinal axis and coaxial with an axis of said beam splitter;
   and said housing further includes a relay lens located therein between said display module and said beam splitter, and coaxial with said transverse axis.

13. The auxiliary optical unit according to claim 12, wherein said laser transmitter and said laser beam transmitter lens are located in a second optical channel in said housing having a second longitudinal axis which is lateral of and parallel to said first longitudinal axis.

14. The auxiliary optical unit according to claim 13, wherein said laser beam receiver and said laser beam receiver lens are located in a third optical channel in said housing having a third longitudinal axis which is lateral of and parallel to said first and second optical axes.

15. The auxiliary optical unit according to claim 14, wherein said third optical channel in said housing is located between said second optical channel and said display module.

16. The auxiliary optical unit according to claim 10, wherein said housing further includes a manual control member for manually turning "on" or "off" the measured range display.

17. The auxiliary optical unit according to claim 10, wherein said housing further includes a manual control member for manually increasing or decreasing the brightness of the measured range display.

18. The auxiliary optical unit of claim 1, in combination with an optical device to which the auxiliary optical unit is attached in a quickly-attachable/detachable manner.

19. The auxiliary optical device of claim 1, in combination with a telescopic gun sight optical device to which the auxiliary optical unit is attached in a quickly-attachable/detachable manner.

* * * * *